United States Patent Office 3,244,536
Patented Apr. 5, 1966

3,244,536
PROCESS FOR MAKING FILLER COMPOSITIONS
David P. Kidger, Glen Rock, N.J., assignor to National Biscuit Company, a corporation of New Jersey
No Drawing. Filed June 3, 1963, Ser. No. 284,847
2 Claims. (Cl. 99—139)

This application is a continuation-in-part of U.S. Serial No. 165,936, filed January 12, 1962, now abandoned. This invention relates to fats and more specifically to shortenings used in filler compositions for bakery products such as cookies and cakes.

"Filler" is the name given to the compositions used in bakery products, where one layer of a cream or a filling is interposed between two horizontal pieces in a sandwich fashion.

It is usually stated that one of the essential requirements of a good shortening is a high plastic range, that is, a wide temperature range over which the fat is soft, workable and yet it is in the solid state. This property is necessary to give richness and tenderness to the finished products. However, for a filler fat it is preferable to have a short plastic range, with a high solid fat content at low temperature and approximately zero at 40° C. (104° F.).

For instance at 50° F. the solid fat content should be 45%, at 80° F. at least 25%, at 92° F. not less than 12.5%, but at 100° F. it should be not greater than 3% and at 104° F., not greater than 0.5%. From these figures, it is obvious, that a good filler fat should retain its consistency at room temperature and melt completely and rapidly at body temperature. This last characteristic, due to the short plastic range, is commonly called in the art "get away."

Another requirement of a good filler fat is the ability, after incorporation into a filler composition, to hold air even at a temperature of 95° F. for several days, and to retain the air on storage. This process of whipping air into fillers is customary practice, whenever the nature of the fat permits it.

Another requirement is that the resulting filler should be stable in hot weather, without oiling out or sticking, because this would make the products unsalable.

Still another requirement is that the shortening be free from odors and off-flavors.

Several methods are known in the art to improve the quality and performance characteristics of fats. Hydrogenation usually is responsible for greater plasticity of the products used in filler compositions.

Another improvement has been achieved by incorporation of antioxidants which give resistance against development of flavors and odors. Interesterification has been widely applied to change the melting range of the fat composition. It has also been attempted, with some success, to prepare mixtures of animal and vegetable fats, and subject same to hydrogenation.

Despite the efforts mentioned, even the best processed filler fats still have a number of disadvantages, such as a too narrow "plastic range," that is the temperature range within which the shortening retains its plasticity before it becomes soupy or too hard to be workable, is too small. Coconut oil for instance, which is used in some filler formulations, has too short a plastic range. It has the additional disadvantage that it contains a small proportion, only about 5%, of a $C_{18}$ acid, oleic acid, and no acid of higher carbon chain. Thus the ability of coconut oil to retain air is practically none. Another disadvantage, mainly with insufficiently hydrogenated lard, is the development of undesirable flavors and odors, due to air oxidation.

Principal objects of the present invention are to produce filler fat compositions, made as more specifically described hereinafter, from animal and vegetable fats, which are markedly superior to prior shortenings in their combination of plastic range, stability and improved air-holding ability for fillers.

Other objects are to provide shortenings made from blends of animal and vegetable fats which combine the advantages of a fast melting rate and a clean mouth feel. Another object is to provide superior filler fats at a cost lower than other fats known.

It has now been discovered that an improved filler fat may be obtained by the combination of a component A which is a partially hydrogenated fat with a high content of $C_{18}$ fatty acids, with component B which is a vegetable oil containing a high proportion of lauric acid. The blend is then subjected to interesterification. As the starting material for component A, any animal fat or vegetable oil may be used as long as it contains at least 50% of $C_{18}$ acid. Tallow and lard are preferably used because of their low cost. As component B, any vegetable oil which contains lauric acid may be used. Coconut oil and palm kernel oil are satisfactory.

The proportion of the two components A and B may be varied over a wide range, namely 50 to 90% of component A and 50 to 10% of component B.

In the practice of the invention, the fat or oil with at least 50% of $C_{18}$ acid, is hydrogenated, under carefully controlled conditions, to form component A, then blended with component B, the blend subjected to interesterification, deodorization to remove impurities, the resulting shortening mixed with the other ingredients of the filler and air is finally whipped into the filler, to lower the specific gravity. In the case of lard, hydrogenation may be conducted until it is between 12 and 26%, preferably between 12 and 23%. In the case of tallow, hydrogenation may be conducted until it is between 8 and 44%, preferably between 17 and 44%.

It is manifest that according to this instant invention, both the hydrogenation which leads to component A and the proportion between components A and B may be varied. Thus if hydrogenation is conducted to a point which will give sufficient hardness to component A, a greater proportion of component B is desirable, for instance the ratio of component A to B should be 70:30 or 60:40%. On the other hand, if the final filler is to be used during very hot summer weather, the proportion of component A should still be left at 90% and component B at 10%.

The filler fat in accordance with this instant invention has a Wiley melting point between 102° and 108°, and preferably between 102° and 104° F. Several combinations of lard and tallow, both partially hydrogenated, may be used with either coconut or palm kernel oil, and still give a melting point in the desirable range.

Hydrogenation of the animal fat is carried out to a point at which the iodine value of the resulting material, is sufficient to give the desired hardness of the fat. The method of hydrogenation does not form a part of this invention and therefore will not be elaborated upon herein. For our purposes, a suitable method of hydrogenation comprises heating at a temperature between 150–225° F. and pressure between 5 and 30 p.s.i., in the presence of a hydrogenation catalyst such as reduced nickel. The degree of hydrogenation must be accurately controlled, because excessive hydrogenation would produce a waxy, hard fat, and insufficient hydrogenation would not impart temperature stability above 95° F. It has now been found that if hydrogenation of tallow is conducted until the iodine value of the product is between 25 and 42, a specific proportion of component B, anywhere within the range 10 to 50%, may be found, to give still a shortening suitable for incorporation in the filler of desirable properties. Thus the hydrogenation of tallow may be conducted to a maximum of 44%, corresponding to iodine value of 25, and a minimum of 8%, corresponding to iodine value of 42.

In the case of lard, the hydrogenation may be conducted to a maximum of 26%, corresponding to iodine value of 41 and a minimum of 12%, corresponding to iodine value of 49. Preferably the hydrogenation is conducted to a maximum of 23%, with iodine value of 42 and a minimum of 12%, with iodine value of 49 in the case of lard. In the case of tallow, the preferred range is between 44%, that is, iodine value of 25 and 17%, that is iodine value of 38. After the partial hydrogenation, component A is well mixed with component B, under mild heating conditions until a uniform liquid blend is obtained. This operation must be conducted at a temperature above the melting point of the hydrogenated fat.

In order to interesterify, the blend of ingredients is heated in a reaction vessel to a temperature slightly above the boiling point of water. Nitrogen is continuously passed over or through the blend which is kept in a continuous state of agitation, to remove any traces of moisture. A suitable interesterification catalyst, such as sodium methoxide, is added, and the interesterification is allowed to proceed to completion. Upon completion of the reaction, a 25% excess of water above the amount of sodium methoxide employed, is added to inactivate the catalyst. The "foots" or soapstock, that is, solids formed by hydrolysis of the fats and salt formation, are removed by filtration while the interesterified compound is still at a temperature high enough to be liquid. This liquid interesterified product is finally deodorized by volatilizing under high vacuo the low-boiling flavor-producing compounds and other volatile impurities.

was then lowered to 85° C. (185° F.), and three ml. of water were added to inactivate the unused catalyst. The solid "foots" or soapstocks were removed by filtration and the liquid filtrate steam distilled under high vacuo at about 200° C. to remove the volatile impurities.

Determination of the solid fat index at different temperatures from the specific volumes was conducted according to the method CD–10–61, described in Official and Tentative Methods of the American Oil Chemists Society (1961). The results are shown in Table I below.

Table I.—Solid fat index at different temperatures of the interesterified mixture of 70% hydrogenated tallow and 30% coconut oil

| T.° F. | S.F.I. |
|---|---|
| 50 | 51.49 |
| 70 | 37.06 |
| 80 | 30.63 |
| 92 | 14.83 |
| 100 | 5.81 |
| 104 | 2.04 |

From the table, it is clear that the composition used, 30% coconut oil, 70% tallow previously hydrogenated to a refractive index of 35.95, Butyro scale, 60° C., has high solid content at low temperature and very low solid content at body temperature, after interesterification.

Coconut oil and tallow were also combined in other proportions and with tallow hydrogenated to different extent. The resulting composition, after interesterification were very satisfactory as filler fats. The melting point was determined in each case by the Wiley method. The results are shown in Table II.

Table II.—Compositions of partially hydrogenated tallow (50–99%) and coconut oil (50–10%), after interesterification

|  | 90% tallow, 10% coconut | 80% tallow, 20% coconut | 70% tallow, 30% coconut | 60% tallow, 40% coconut | 50% tallow, 50% coconut |
|---|---|---|---|---|---|
| Refractive Index of Hydrogenated Tallow | 36.6 | 36.3 | 35.95 | 35.3 | 34.2 |
| Iodine Value of Hydrogenated Tallow | 42 | 40 | 38 | 32 | 25 |
| M.P. ° F. of Hydrogenated Tallow |  | 115 | 117 | 122.5 | 127 |
| Solid Fat Index of Product in percent at— |  |  |  |  |  |
| 50° F. | 38.9 | 44.2 | 49.7 | 53.1 | 58.2 |
| 70° F. | 26.5 | 30.6 | 36.0 | 42.8 | 44.2 |
| 80° F. | 23.5 | 25.3 | 29.6 | 29.3 | 35 |
| 92° F. | 14.9 | 13.7 | 14.9 | 13.8 | 14.5 |
| 100° F. | 8 | 5.4 | 5.0 | 5.1 | 3.1 |
| 104° F. | 5.4 | 2.3 | 1.8 | 2.2 | 0.6 |
| Refractive Index (product) | 35.4 | 33.6 | 32.15 | 31.45 | 29.85 |
| Iodine Value (product) | 40 | 36 | 31 | 27 | 24 |
| Melting Point ° F. (product) Wiley | 107 | 108 | 106 | 106 | 102.5 |

The following examples illustrate various percentage mixtures of the interesterified animal and vegetable fat, prepared in accordance with the invention and the desirable characteristics of the products as filler fats.

EXAMPLE I

Seven hundred grams of tallow, hydrogenated to a refractive index of 35.95, and iodine value of 38, and melting point 117° F., corresponding to about 17% hydrogenation, were blended with 300 grams of coconut oil in a reaction vessel. The vessel was closed and heated to 105° C., while nitrogen was passed through to remove and traces of water. Two grams of sodium methoxide were added to the dry blend, as a catalyst for the interesterification reaction. The color rapidly changed from light brown to red-orange. After heating one-half hour at 105° C., the reaction was complete. The temperature From the table, it is clear that although the proportions of components A and B are varied over a wide range as long as the extent of hydrogenation of tallow is also varied prior to interesterification, over a wide range, between iodine value of 25 and 42, very desirable compositions are obtained with a Wiley melting point in the range 102.5° to 108° F. Although 108° F. melting point may be more satisfactory in extremely hot weather, the most desirable range of melting point for most operations is 102° to 104° F. This desirable range of melting point may be obtained from tallow hydrogenated as far as iodine value of 25, as well as from samples where the hydrogenation is conducted to an iodine value of 38.

Similar results with desirable Wiley melting point are obtained with the composition comprising partially hydrogenated lard and either coconut oil or palm kernel oil. Table III gives the results with lard, partially hydrogenated and palm kernel oil, followed by interesterification.

Table III.—Compositions of partially hydrogenated lard (60 to 80%) and palm kernel oil (40 to 20%) after interesterification

|  | 80% lard, 20% palm kernel oil | 70% lard, 30% palm kernel oil | 60% lard, 40% palm kernel oil |
|---|---|---|---|
| Refractive Index of Hydrogenated Lard | 37.35 | 36.65 | 36.2 |
| Iodine Value of Hydrogenated Lard | 49 | 44 | 41 |
| M.P. of Hydrogenated Lard | 119.5 | 122 | 127 |
| Solid Fat Index of Product in percent at— | | | |
| 50° F | 47.5 | 54.0 | 54.6 |
| 70° F | 34.0 | 38.8 | 40.8 |
| 80° F | 27.8 | 32.6 | 30.6 |
| 92° F | 14.6 | 15.8 | 14.1 |
| 100° F | 5.1 | 5.7 | 3.3 |
| 104° F | 1.1 | 1.3 | 0 |
| Refractive Index of Product | 34.8 | 33.8 | 32.55 |
| Iodine Value of Product | 43 | 37 | 31 |
| Melting Point of Product, Wiley ° F | 103 | 104 | |

As it is shown in the table above, the melting point range 103 to 104° F. for the final product is obtained although the extent of hydrogenation of lard is varied in iodine value between 49 and 44.

The results of compositions of lard, partially hydrogenated and coconut oil, after interesterification, are shown below.

Table IV.—Compositions of partially hydrogenated lard (50–80%) and coconut oil (50 to 20%) after interesterification

|  | Lard 80%, coconut 20% | Lard 70%, coconut 30% | Lard 60%, coconut 40% | Lard 50%, coconut 50% |
|---|---|---|---|---|
| Refractive Index of Partially Hydrogenated Lard | 37.5 | 36.7 | 36.7 | 36.3 |
| Iodine Value of Partially Hydrogenated Lard | 41 | 42 | 42 | 41 |
| M.P. (Wiley) of Partially Hydrogenated Lard | 118.5 | | | |
| Solid Fat Index in percent at— | | | | |
| 50° F | 46.3 | 48.5 | 51.2 | 50.6 |
| 70° F | 31.9 | 33.2 | 34.3 | 34.6 |
| 80° F | 26.2 | 26.4 | 25.7 | 23.1 |
| 92° F | 13.4 | 11.7 | 8.8 | 5.6 |
| 100° F | 4.7 | 2.8 | 0.7 | 0 |
| 104° F | 1.7 | 0.1 | 0.0 | 0 |
| Refractive Index of Product | 34.95 | 33.3 | 32.05 | 30.85 |
| Iodine Value of Product | 40 | 35 | 31 | 27 |
| Melting Point of Product (Wiley), ° F | | 103 | 101 | 96 |

Experiments conducted with the same component A and B but in different proportions, indicated the necessity of operating in the range shown in the tables. For instance, when tallow, hydrogenated until the refractive index was 35, was mixed with coconut, in the proportion tallow 40% to 60% of coconut, and then interesterified, the blend was too soft to be workable. Similarly when a blend was prepared from 95% tallow and 5% coconut, the material after interesterification was too hard, and at 104° F., still had 11.45% solids.

A characteristic of the compositions prepared in accordance with the instant invention, is their ability to retain a great amount of air, after incorporation into the filler compositions. The general formulation for a filler composition comprises 600–700 parts of 4X sugar, 20–25 parts of skim milk powder, 300–400 parts of shortening, 0.05 part of lecithin, and vanillin or other flavor as desired, usually 0.02 part. All the ingredients are mixed except about one-half of the sugar which is added later. The ingredients are homogenized at 120° to 140° F., then the blend let cool under mechanical stirring, in order to allow the filler, as it cools, to entrap air. The mechanical agitation is continued until the desired specific gravity is achieved. The compositions of the invention require 6 minute mechanical stirring with a stirrer rotating at a speed between 240 and 260 r.p.m., to give a specific gravity of 0.85. Under the same condition, partially hydrogenated cottonseed oil requires 12.5 minutes to give the same specific gravity. By more prolonged stirring, namely 20 minutes, a specific gravity, of 0.73 is achieved. Under prolonged stirring, 23 minutes, partially hydrogenated cottonseed oil still gives essentially the same specific gravity of 0.85.

Thus one characteristic of the compositions of this invention is their ability to entrap air and retain a great deal of air, with resulting lightness of the product, in a very short period of time. Another characteristic is the ability to retain the entrapped air, indefinitely, when applied to baked goods, even at a temperature of 95° F.

The advantage of the fats prepared according to this instant invention, may readily be understood, if one considers that coconut oil, one of the fats frequently used in fillers, cannot be aerated, and the filler compositions prepared from it have the disadvantage of not being light and are inferior in palatability.

By way of comparison, with other commercially available fats and oils, partially hydrogenated soybean oil may be whipped with air to a low specific gravity, of 0.85, but it contains a too high proportion of $C_{18}$ acids, which is responsible for a waxy taste of the resulting filler.

Although the compositions of the invention are very suitable to be incorporated in filler compositions, other applications have proved very satisfactory, without prior entrapment of air. By way of illustration, a highly palatable icing was prepared from 2 pounds of a shortening prepared according to this invention, 19 pounds and 14 ounces of powdered sugar, 1 ounce of salt, 3 pounds of hot water, 1 ounce of lecithin and some flavor, usually 1 ounce, for instance of vanillin. All the ingredients were mixed with the exception of the shortening and one-half of the sugar which was added after the first blending.

A very satisfactory chocolate icing was prepared from 2.5 pounds of shortening, 1 pound of non-fat milk powder, 15 pounds and 3 ounces of powdered sugar, 1 ounce of gelatin as a stabilizer, 10 ounces of corn syrup or invert syrup, 1 ounce of fine salt, 1 ounce of lecithin, 3 pounds of hot water, 2.5 pounds of cocoa powder and 0.25 pound of flavoring agent, namely vanilla. The ingredients were mixed by mechanical stirring, and the shortening and one-half of the sugar were added later.

The fat compositions prepared according to the instant invention are also very satisfactory for use in cake and cookie mixes, which are marketed already prepared, with only one ingredient to be added before use. The fat compositions prepared according to this instant invention, may also be used in the conventional formulations for cakes and cookies, in combination with flour, milk, sugar, eggs and flavoring agents. The proportion of the novel fat compositions is the same as the conventional shortenings which are being replaced. The resulting cakes and cookies are very light and palatable.

From the foregoing, it will readily be understood that one substantial advantage has been made possible by this instant invention, namely the preparations of compositions suitable as fillers, and capable of acquiring a specific gravity as low as 0.73 upon whipping air into them for just twenty minutes, and a specific gravity of 0.85 in just six minutes. Modifications and variations of the inventions may be effected without departing from its scope, which is to be limited only by the appended claims.

What is claimed is:

1. The method of preparing a filler composition of specific gravity 0.85 after 6-minute mechanical whipping, and specific gravity 0.73 after 20-minute mechanical whipping, which comprises the steps of
    (1) hydrogenating lard until the iodine value is 42,
    (2) blending 70 parts of said partially hydrogenated lard from step 1 with 30 parts of coconut oil,
    (3) subjecting said blend from step 2 to interesterification conditions,
    (4) blending 300 to 400 parts of said product from step 3 with 300 to 350 parts of sugar, 20 to 25 parts of skim milk powder, 0.05 part of lecithin, 0.02 part of flavoring agent, adding to said blend 300 to 350 parts of sugar, homogenizing at 120° to 140° F., cooling, and simultaneously
    (5) subjecting to mechanical agitation for a period of time between 6 minutes and 20 minutes, at a speed between 240 and 260 r.p.m.

2. The method of preparing a filler composition of specific gravity 0.85 after 6-minute mechanical whipping and specific gravity 0.73 after 20-minute mechanical whipping, which comprises the steps of
    (1) hydrogenating tallow until the iodine value is 38,
    (2) blending 70 parts of said partially hydrogenated tallow from step 1 with 30 parts of coconut oil,
    (3) subjecting said blend from step 2 to interesterification conditions,
    (4) blending 300 to 400 parts of said product from step 3 with 300 to 350 parts of sugar, 20 to 25 parts of skim milk powder, 0.05 part of lecithin, 0.02 part of flavoring agent, then adding to said blend 300 to 350 parts of sugar, homogenizing at 120° to 140° F., cooling and simultaneously
    (5) subjecting to mechanical agitation for a period of time between 6 minutes and 20 minutes, at a speed between 240 and 260 r.p.m.

References Cited by the Examiner

UNITED STATES PATENTS 2,859,119 11/1958 Cochran et al. _____ 99—118
2,892,721 6/1958 Nelson _____ 99—118

OTHER REFERENCES

Bailey: Industrial Oil and Fat Products, Interscience Publ. Inc., N.Y., 1951, pp. 122, 136, 325.

Bohn: Biscuit and Cracker Production, American Trade Publ. Co., N.Y., 1957, p. 178.

A. LOUIS MONACELL, *Primary Examiner.*

HYMAN LORD, *Examiner.*

M. W. GREENSTEIN, *Assistant Examiner.*